Oct. 15, 1968  L. P. GOULD ET AL  3,406,009

PROCESS FOR ALUMINUM CHLORIDE PRODUCTION

Filed Dec. 23, 1965  2 Sheets-Sheet 1

INVENTORS:
LAWRENCE P. GOULD
BERNARD L. OECHSLI
BY

AGENT

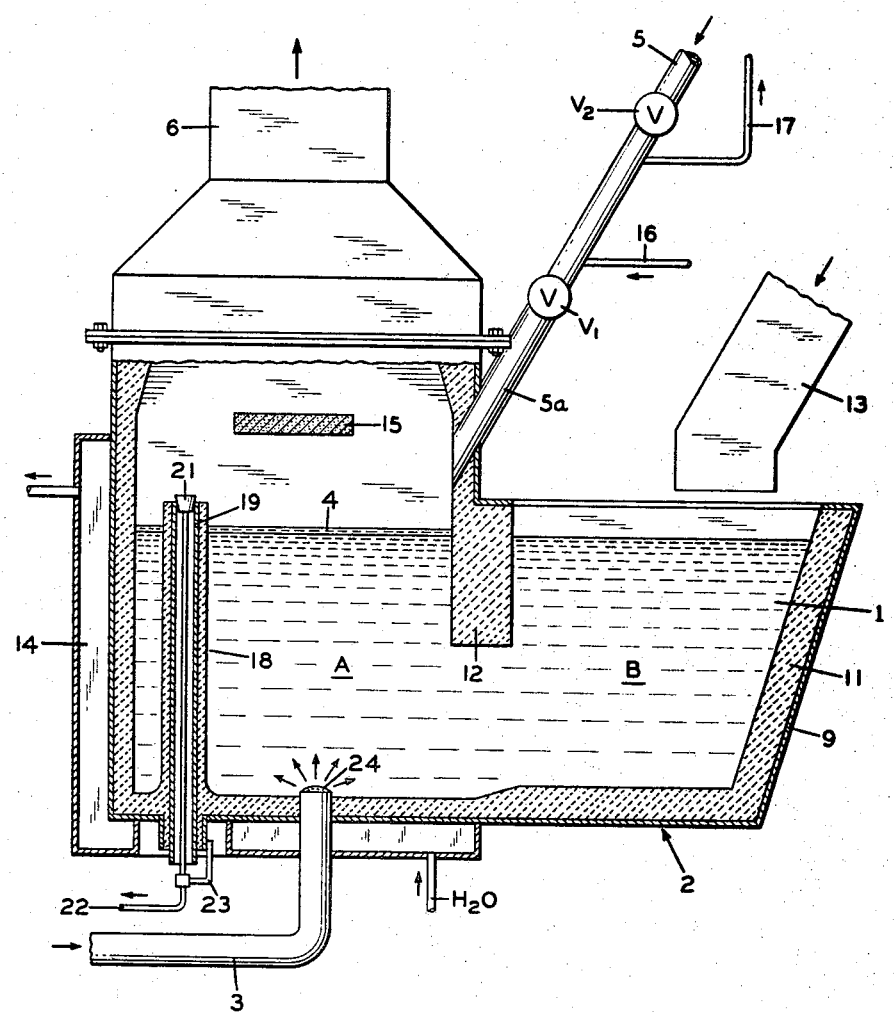

3,406,009
PROCESS FOR ALUMINUM CHLORIDE PRODUCTION
Lawrence P. Gould, Syracuse, and Bernard L. Oechsli, Camillus, N.Y., assignors to Allied Chemical Corporation, New York, N.Y., a corporation of New York
Filed Dec. 23, 1965, Ser. No. 515,968
5 Claims. (Cl. 23—93)

ABSTRACT OF THE DISCLOSURE

The process relates to the production of aluminum chloride containing no more than 10 p.p.m. iron impurities by a process which involves passing chlorine through a molten bath of aluminum contaminated with iron impurities to form aluminum chloride containing iron impurities and then passing the so-formed contaminated aluminum chloride through a sodium aluminum chloride salt layer which is on top of the molten aluminum. The vaporous aluminum chloride recovered after passing through the layer of salt contains no more than 10 p.p.m. iron impurities.

---

Aluminum chloride is a well-known compound which has found wide spread use in the dye, metallurgical and medical arts and especially in the petroleum and catalysis (Friedel-Crafts catalyst) fields. Aluminum chloride has proven to be a valuable polymerization catalyst in the preparation of sythetic rubbers, plastics, and lubricants.

Aluminum chloride is conventionally prepared by a number of well-known methods, such as, (1) by crystallizing anhydrous aluminum chloride from a hydrochloric acid solution (2) by the reaction of bauxite or alumina with coke and chlorine at about 1500° F. (3) by the reaction of chlorine with molten aluminum. The aluminum chloride, produced by any one of the foregoing methods, contains substantial quantities of impurities, such as ferric chloride which is formed by the reaction of chlorine with small amounts of iron which are invariably present in the aluminum charge. In a continuous process such impurities cause difficulties, since in the course of time impurities and by-products collect in the apparatus in the form of slag and deposits whereby interruption of the chlorination process is required at frequent intervals in order to cleanse the apparatus. Further, the ferric chlorides present as impurities impart an often undesired yellow color to the essentially white aluminum chloride product. Moreover, with respect to the catalytic activity of aluminum chloride, these impurities have a powerful influence and may function as catalyst inhibitors or catalyst poisons.

The prior art has proposed many processes for the purification of aluminum chloride. These processes are generally multi-step processes which require the production of aluminum chloride in the crude form and subsequent treatment with chemical reagents, fractional distillation or sublimation techniques in order to recover relatively pure aluminum chloride. In contradistinction to the prior art processes, the method of the present invention provides a one-step process for the production of aluminum chloride which has an extremely low content of metallic impurities.

It is therefore an object of the present invention to provide a new and improved process for the preparation of aluminum chloride whereby the amount of metallic impurities present in the aluminum chloride product is rigidly controlled. A further object of this invention is to provide a new and improved apparatus for the production of aluminum chloride.

Other objects and advantages of the present invention will become apparent from the following description and accompanying drawings.

The present invention provides an improved method for preparing a substantially pure aluminum chloride which comprises introducing aluminum into a reaction zone and maintaining molten aluminum therein, passing chlorine through and into contact with the molten aluminum thus forming aluminum chloride vapor, passing the vaporous aluminum chloride through and into contact with a fluid salt layer maintained above and in contact with the molten body of aluminum to thereby effect removal of the metallic impurities, releasing aluminum chloride vapor substantially free of metallic impurities from the top of the fluid salt layer, cooling and condensing said released aluminum chloride vapor to produce solid essentially white aluminum chloride substantially free of metallic impurities.

The formation of aluminum chloride is a highly exothermic reaction and once the reactor is in operation, the solid aluminum added will be continuously melted and maintained in the molten state by the exothermic heat of reaction. In order to start the process, the aluminum may be melted in the reactor by the use of a permanent or removable heating means, the injection of chlorine started and the heating means removed or its use discontinued. Alternatively, aluminum may be first melted in a separate furnace and then charged into the reactor at the same time the injection of chlorine is begun. In either case, once the process is started the exothermic heat of reaction is utilized to melt aluminum charged to the reactor. The molten aluminum is maintained in the reactor at temperatures of above about 660° C. with the preferred temperature being in the range of 750–900° C. The starting solid aluminum material may be any of the commercially available aluminums such as the reagent and technical grades having iron contents of from as low as 0.003 percent or lower up to about 1.0 percent and higher.

The fluid salt layer maintained above and in contact with the molten aluminum is formed by adding crystals of dry sodium chloride to the surface of the molten aluminum body. As $AlCl_3$ vapor mixes with the salt crystals, a layer of the double salt $NaAlCl_4$ is formed which is molten and as fluid as water. $FeCl_3$, which is produced from the action of the chlorine on the iron impurities in the molten aluminum, forms the double salt $NaFeCl_4$. The formation of this latter double salt is of no advantage in itself as $FeCl_3$ would be distilled from the double salt under normal process conditions and contaminate the final product. In the process of the present invention ascending aluminum chloride vapor and the heat of chlorination cause the molten aluminum to ascend and force it into the fluid salt layer where the aluminum has the effect of retaining the metallic impurities which comprise $FeCl_3$, $FeCl_2$ and metallic iron. As a result of such retention, the iron content of the final aluminum chloride product is effectively reduced. The depth of the fluid salt layer is not critical; a salt layer having a depth of as little as ⅛ inch will substantially reduce the amount of iron impurities present in the final $AlCl_3$ product. However, in order to obtain a final $AlCl_3$ product containing 10 p.p.m. or less iron impurities it is preferred to employ a fluid salt layer having a depth of from 0.25 inch to about 2.0 inches. Optimum reaction conditions, viz. a reactor production capacity of about 60 lbs. of $AlCl_3$ per hour, are attained when the depth of aluminum in the reactor is approximately 18 inches and the depth of the fluid salt layer is about 2 inches. The horizontal cross-section is 290 in.$^2$.

The present invention further provides an apparatus for performing the foregoing process. The apparatus in its essential features consists of a source of chlorine vapors such as produced by conducting liquid chlorine from a tank car or other source to a vaporizer where heat is added to produce chlorine vapor. An aluminum chloride reactor which comprises a steel shell lined with a castable refractory capable of withstanding the effect of molten aluminum, chlorine and aluminum chloride at the reaction temperature which ranges from about 750–900° C. Additional features of the present invention, with respect to the aluminum chloride reactor, include the use of a heated air lock for salt addition. This air lock comprises a pipe with a valve at each end designed to hold about two pounds of dry sodium chloride. The section of pipe between the lower valve and the reactor is heated externally to prevent plugging by solid aluminum chloride deposits. Another novel feature of the aluminum chloride reactor is the presence of a molten salt overflow. This feature is incorporated because it is anticipated that occasions will arise when the production schedule requires a change from the white to the yellow colored product, since the various uses for aluminum chloride have differing specifications for their particular reactions, in which event all or a part of the fluid-salt layer may be removed from the reactor by means of the salt overflow. We have further found, that the purity and desirable white color of the final aluminum chloride product may be further enhanced by employing baffles composed of silicon carbide. A further feature of the apparatus of the present invention includes a refractory-lined pipe by means of which aluminum chloride vapors produced in the reactor are led into an air-cooled steel condenser wherein the solid crystalline aluminum chloride is recovered and packed by means of auxiliary equipment which includes conveyors, mill, screens and packing apparatus.

The process and apparatus which constitute the present invention are more clearly described when discussed in conjunction with the accompanying drawings, in which:

FIG. 2 is a more detailed partial section of the improved aluminum chloride reactor of the present invention.

Figure 1:
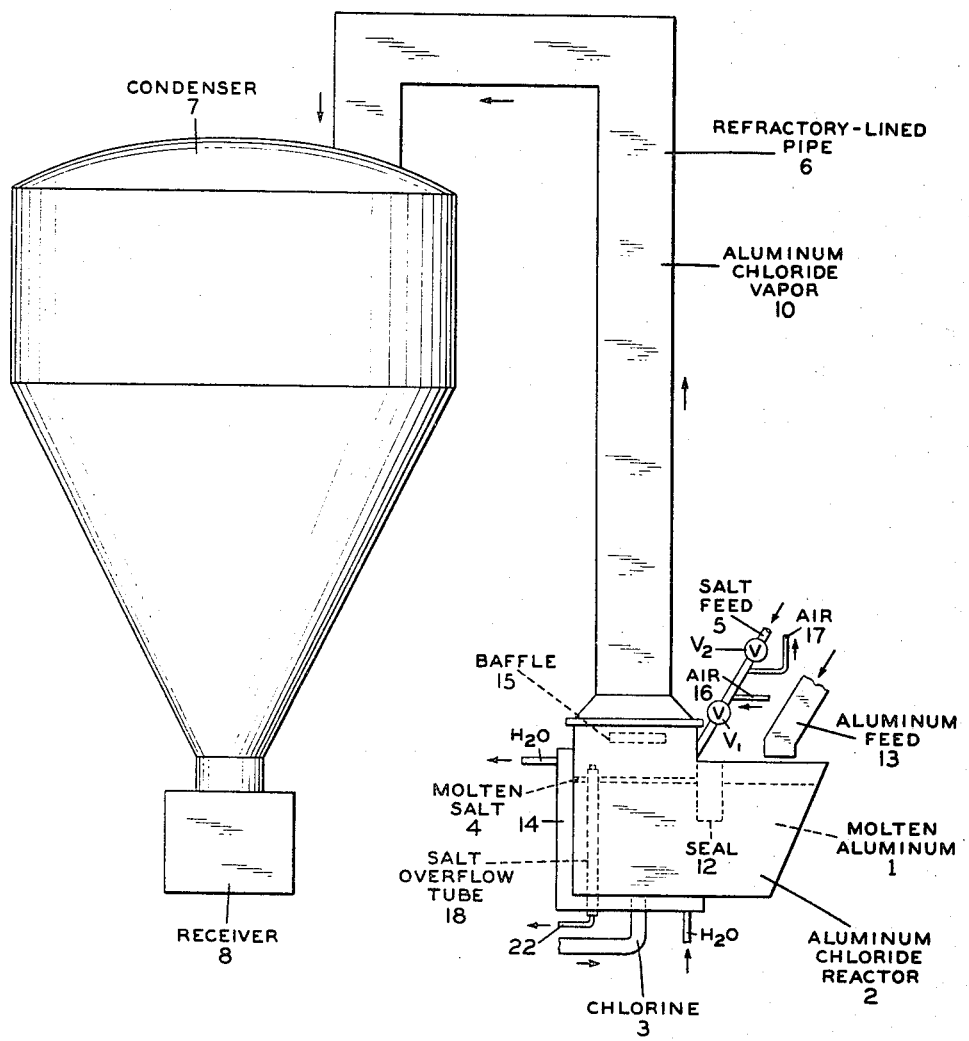
FIG. 1 is a diagrammatic drawing which illustrates apparatus suitable for carrying out the process of the present invention.

Describing the process of the invention with reference to FIG. 1 of the drawings; molten aluminum 1 is contained in aluminum chloride reactor 2 into which chlorine is fed through a spraying means such as a perforated graphite sparger, located in pipe 3. The chlorine reacts with the molten aluminum 1 to form a vapor comprising aluminum chloride. The vapor thus formed ascends and is scrubbed as it passes through molten salt layer 4. The molten salt layer 4 is formed by the interaction of dry sodium chloride crystals, fed through salt feed 5, the molten aluminum, and the vapor comprising aluminum chloride. The resulting scrubbed aluminum chloride vapor 10 is collected and discharged through refractory lined graphite sparger, located in pipe 3. The chlorine reacts deposits of aluminum chloride are formed, which are periodically removed from receiver 8 and processed further for shipment.

Another feature of the present invention is the improved aluminum chloride reactor shown in FIGURE 2 now discussed in conjunction with said drawing.

There is shown an aluminum chloride reactor 2 which comprises a steel shell 9 lined with a castable refractory 11 which is capable of withstanding the effects of molten aluminum, chlorine and aluminum chloride at the reaction temperatures of 660–1000° C. Examples of such refractory materials are the hydrated aluminum silicate clays. This refractory lining has a thickness of about ¾ inch in the area of the main body of the reactor and is tapered to a thickness of about 1¼ inches in the feed box area of the reactor. A partition 12 composed of the same refractory materials as lining 11 is built into refractory lining 11 and extends downwardly beneath the surface of the molten aluminum body 1 to divide the metal contained in the reaction chamber into two inter-communicating zones namely, a reaction section or main body of the reactor designated A and a feed box section designated B. The solid aluminum metal to be charged to the reactor may be added through feed 13 located on the open side of partition 12. Once the reactor is in operation, when the solid aluminum is fed into the feed box section B of the reactor it melts and flows under partition 12 and thus maintains the level of molten aluminum in the reaction chamber despite the removal of aluminum, as aluminum chloride. A chlorine feed 3 through which chlorine gas is introduced and dispersed through the molten aluminum body by means of a perforated graphite sparger, 24, is located at the base of the main body A of the reactor. A cooling means such as water jacket 14 surrounds the bottom and sides of main body A of the reactor. A baffle 15, preferably composed of silicon carbide, is built into refractory lining 11 at a point above the level of the molten aluminum body. This baffle prevents spray from the aluminum and fluid salt melts which is entrained with the issuing aluminum chloride vapor from being thrown towards the aluminum chloride vapor outlet 6 where such spray may solidify in the course of the time and cause clogging of the aluminum chloride vapor outlet. A salt feed means 5 such as a 15″ x 2″ diameter pipe with valves $V_1$ and $V_2$ at each end along with dry air purges 16 and 17 and designed to hold about two pounds of dry sodium chloride crystals is inserted into the main body of the reactor at a point above the level of the molten aluminum body. The lower portion 5a of the salt feed means extending from $V_1$ to the reactor wall is insulated and heated by external means, not shown in the drawing, to prevent plugging by solid aluminum chloride. And built into refractory base 11 and disposed within the main body A of the reactor is molten salt overflow tube 17 lined with liner 19 composed of a refractory material such as fused alumina. Lapped or ground to form a seal with said liner 19 at the upper end of overflow tube 18 is plug 21 which may be composed of the same refractory material as liner 11. Cast within said plug is rod 22 composed of a high temperature resistant metal such as the cast nickel-chromium-iron alloys of the Inconel type. Said rod 22 extends downwardly through overflow tube 18 and guiding means 23. Said rod, which may be raised or lowered manually, serves as a means for releasing plug 21 when it is desired to reduce the depth of fluid salt layer 4.

The following examples are given to illustrate the present invention only. It is recognized that conditions and compositions may be varied without departing from the spirit or scope of the invention.

Examples

A laboratory scale preparation of $AlCl_3$ was used to illustrate the novel salt scrubbing process of the present invention.

The apparatus employed consisted of a Vycor reaction tube about ¾″ diameter x 18″ long. This is fitted with a ball ring joint to which is attached a Pyrex cap holding a thermowell and chlorine inlet tube. A one-liter Pyrex balloon flask acts as a condenser for the $AlCl_3$ and is connected to the reaction tube by means of glass tubing. The reaction tube and the connecting tube are both heated electrically.

A 100 gram sample of aluminum containing 1% iron was melted in the reaction tube and salt was added before closing the apparatus. When the temperature in the reaction tube reached 700° C., the chlorine flow was started and adjusted to 2000 ml. per minute. The chlorine flow was continued for about 45 minutes when the apparatus was shut down. The procedure was repeated for a total of four runs in which the salt content was varied from 0 to 5 grams. The resulting products were analyzed for iron. Results obtained were as follows:

TABLE 1.—EFFECT OF SALT ON IRON CONTENT

| Wt. NaCl added (gms.) | Ht. fluid salt layer (in.) | Fe in product, p.p.m. |
|---|---|---|
| 1 | 1/8 | 32 |
| 2 | 1/4 | 8 |
| 5 | 1/2 | 4 |
| 0 | | 630 |

As can readily be seen from the results set out in Table 1 above, even a salt layer having a thickness of only 1/8 inch substantially reduces the amount of impurities present in the final $AlCl_3$ product.

For purposes of comparison, the above apparatus and procedure were employed to prepare aluminum chloride, in the absence of a fluid salt layer, from a starting aluminum sample containing 0.003 percent iron. The thus obtained aluminum chloride was found to contain 150 p.p.m. iron. This product was transferred to a subliming apparatus and subjected to sublimation. After sublimation, the $AlCl_3$ recovered was found to contain 149 p.p.m. iron showing that very little purification was effected by this conventional two-step procedure.

We claim:
1. A process for the production of aluminum chloride substantially free of iron impurities which comprises passing chlorine gas in contact with molten aluminum containing minor amounts of iron impurities to effect reaction of the molten aluminum with the chlorine gas to produce vaporous aluminum chloride and vaporous iron chloride, maintaining the temperature of the molten body of aluminum sufficiently high to maintain the thus-produced aluminum chloride and iron chloride in a vaporous state, maintaining above and in contact with said molten body of aluminum a fluid salt layer of sodium aluminum chloride ($NaAlCl_4$), passing molten aluminum and the vaporous aluminum chloride containing minor amounts of vaporous iron chloride impurities produced by the reaction of chlorine with the molten aluminum into the fluid salt layer to effect removal of said iron chloride impurities from said aluminum chloride and recovering the aluminum chloride vapors which pass through and out of said salt layer, substantially free of said iron impurities, said iron chloride being retained in said fluid said layer containing molten aluminum.

2. The method of claim 1, wherein the vaporous aluminum chloride, which passes through the salt layer, is condensed to produce an essentially white, solid aluminum chloride, containing no more than 10 p.p.m. iron.

3. The process of claim 1 wherein the temperature of said molten body of aluminum is maintained in the range of from about 750° C. to about 900° C.

4. The process of claim 1 wherein said fluid salt layer is formed by the addition of dry sodium chloride crystals on the surface of the molten aluminum and subsequent reaction of said crystals with the molten aluminum and aluminum chloride vapors.

5. The process of claim 4 wherein said fluid salt layer has a depth of from about 0.25 to 2.0 inches.

References Cited

UNITED STATES PATENTS

| 409,668 | 8/1889 | Castner | 23—93 |
| 1,165,065 | 12/1915 | Brooks | 23—93 |
| 1,269,236 | 6/1918 | Weaver | 23—93 |
| 1,645,143 | 10/1927 | Humphrey et al. | 23—93 |
| 2,768,070 | 10/1956 | Brazaitis | 23—93 XR |
| 3,052,518 | 9/1962 | Frey | 23—93 |
| 3,336,731 | 8/1967 | Phillips et al. | 23—93 XR |

FOREIGN PATENTS

| 317,259 | 8/1929 | Great Britain. |
| 992,668 | 5/1965 | Great Britain. |

OSCAR R. VERTIZ, *Primary Examiner.*

EDWARD STERN, *Examiner.*